(12) United States Patent
Chen et al.

(10) Patent No.: US 7,795,755 B2
(45) Date of Patent: Sep. 14, 2010

(54) SIMPLE CIRCUIT AND METHOD FOR IMPROVING CURRENT BALANCE ACCURACY OF A POWER CONVERTER SYSTEM

(75) Inventors: Isaac Y. Chen, Jubei (TW); Chien-Fu Tang, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 89 days.

(21) Appl. No.: 12/222,245

(22) Filed: Aug. 6, 2008

(65) Prior Publication Data

US 2009/0039704 A1 Feb. 12, 2009

(30) Foreign Application Priority Data

Aug. 10, 2007 (TW) ............................... 96129659 A

(51) Int. Cl.
*H02J 1/10* (2006.01)

(52) U.S. Cl. .......................................... 307/52; 307/53

(58) Field of Classification Search .............. 307/52–63
See application file for complete search history.

(56) References Cited

U.S. PATENT DOCUMENTS

| | | | | |
|---|---|---|---|---|
| 6,134,122 A | * | 10/2000 | Chen et al. | ..................... 307/58 |
| 2002/0180489 A1 | * | 12/2002 | Ge et al. | ....................... 327/52 |
| 2004/0217741 A1 | * | 11/2004 | Muratov et al. | ............. 323/219 |

* cited by examiner

*Primary Examiner*—Fritz M Fleming
(74) *Attorney, Agent, or Firm*—Rosenberg, Klein & Lee

(57) ABSTRACT

A power converter system includes multiple converter modules connected to a share bus. Each of the converter modules mirrors the phase current of itself to provide a mirror current to the share bus, extracts an average current from the share bus, and compares the phase current of itself with the average current it extracts from the share bus to produce an output signal for modulation of the phase current of itself. Specifically, each of the converter modules is provided with a resistor connected to the share bus such that all the resistors are connected in parallel, and thus each of the resistors automatically receives an average current from the share bus.

6 Claims, 4 Drawing Sheets

SIMPLE CIRCUIT AND METHOD FOR IMPROVING CURRENT BALANCE ACCURACY OF A POWER CONVERTER SYSTEM

FIELD OF THE INVENTION

The present invention is related generally to a power converter system and, more particularly, to a circuit and method for improving current balance accuracy of a power converter system.

BACKGROUND OF THE INVENTION

Power converters have been widely applied in electronic devices. A power converter system generally includes multiple converter modules connected in parallel between a power input and a power output. FIG. 1 shows a converter module 100 of a conventional power converter system, which includes a controller 102 and an output stage 104 driven by the controller 102. The output stage 104 has two power switches 120 and 122 serially connected between a power input Vin and a ground node GND, and two signals Ug and Lg provided by the controller 102 switch the power switches 120 and 122 respectively, thereby modulating a phase current IL flowing through an inductor L in the output stage 104 to a power output Vout. Each of the other converter modules of the power converter system has the same configuration as that shown in FIG. 1. All phase currents of the power converter system are combined into an output current Iout to charge an output capacitor C to thereby generate an output voltage Vout. The controller 102 is a semiconductor chip, which has a pin FB to receive a feedback signal VFB representative of the output voltage Vout, an error amplifier 106 to compare the feedback signal VFB with a reference signal Vref to generate an error signal VEA, and a comparator 108 to compare the error signal VEA with a ramp signal Ramp to generate the signals Ug and Lg. The components in the converter modules may not be matched to each other between the converter modules, and thereby cause current imbalance between the converter modules. Therefore, a current balance mechanism is needed to balance between the phase currents.

For current balance between the converter modules, the controller 102 has a pin SENSE to receive a current sense signal Vs representative of the phase current IL of the associated converter module 100. In the controller 102, the current sense signal Vs is amplified by an amplifier 110 and then biased by a bias voltage source 112 to generate a voltage VI. The bias voltage source 112 prevents the converter nodule 100 from switching between a balance state and a current-adjusting mode. An operational amplifier 114 is configured as a voltage follower to apply the voltage VI to a pin SHARE of the controller 102. The pin SHARE of each converter module of the power converter system is connected to a share bus 124, and therefore the voltage VI_max on the pin SHARE of each converter module will be the maximum of the voltages VI of all the converter modules. In the controller 102, a diode 116 is connected between the output of the operational amplifier 114 and the pin SHARE to prevent reverse current flowing from the pin SHARE to the output of the operational amplifier 114, and an amplifier 118 amplifies the difference between the voltage VI and the maximum voltage VI_max to generate an output signal injecting into the non-inverting input of the comparator 108 for modulation of the phase current IL. The voltage VI represents the phase current IL of the associated converter module 100 while the maximum voltage VI_max represents the maximum one IL_max among all phase currents IL of the power converter system. The comparison between the voltages VI and VI_max can be regarded as the comparison between the phase currents IL and IL_max, and therefore the output of the comparator 118 will adjust the phase current IL of the associated converter module 100 toward the maximum phase current IL_max of the converter modules. For more detailed description of this current balance mechanism, readers are referred to U.S. Pat. No. 6,642,631 to Clavette. However, this current balance mechanism uses a complicated circuit to obtain the information of the phase currents IL and IL_max, and the bias voltage source 112 and the diode 116 will also affect the current balance accuracy.

Therefore, it is desired a simple circuit and method for improving current balance accuracy of a power converter system.

SUMMARY OF THE INVENTION

An object of the present invention is to provide a circuit and method which are simpler and provide better current balance accuracy for a power converter system.

According to the present invention, a power converter system has a plurality of converter modules connected to a share bus, and the share bus collects all the phase currents of the converter modules. A plurality of resistors are connected in parallel to the share bus, each of the converter modules has one of the resistors to extract an average current from the share bus as a reference signal for comparison for modulation of the phase current of the associated converter module.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
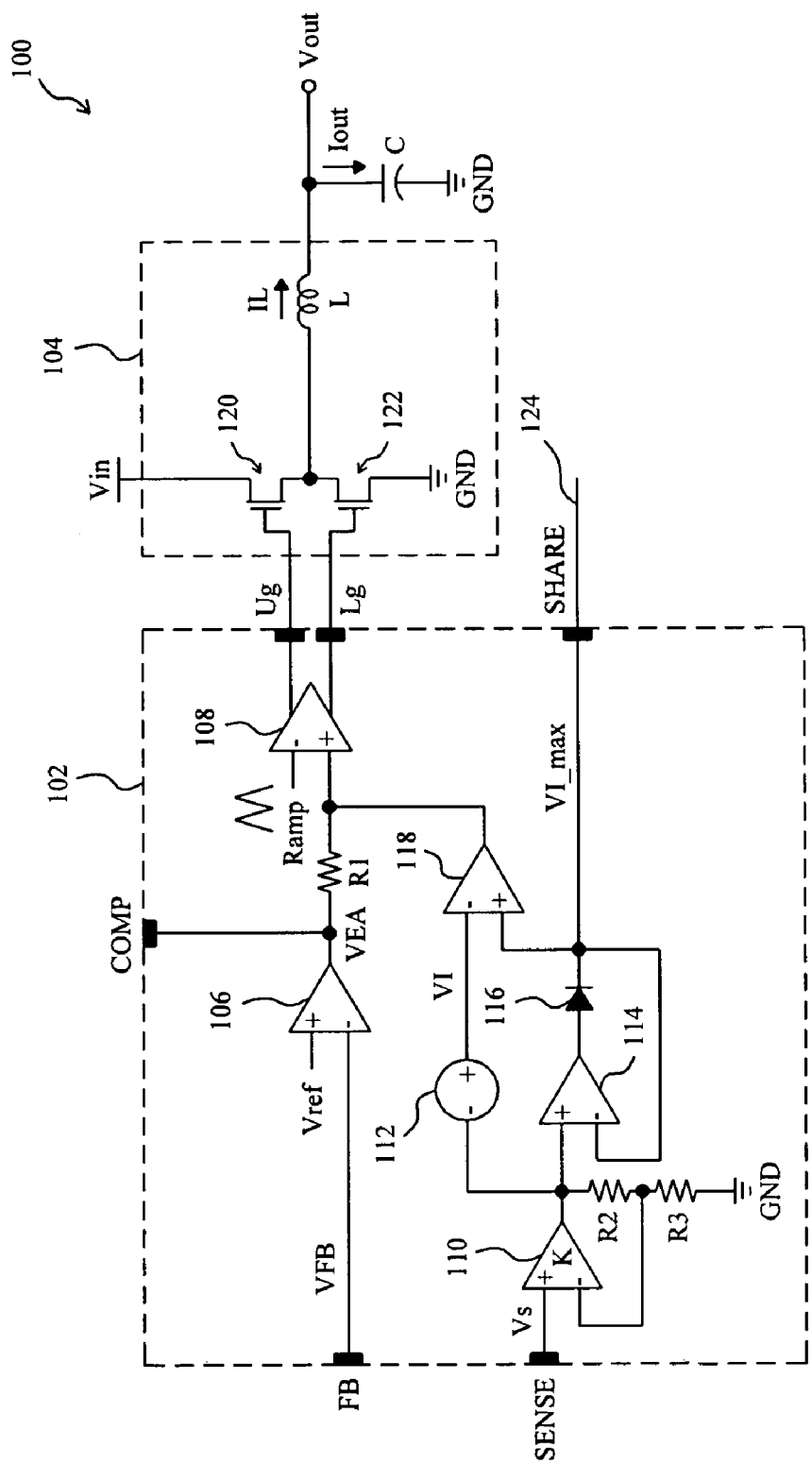
FIG. 1 is a converter module of a conventional power converter system.
Figure 2:
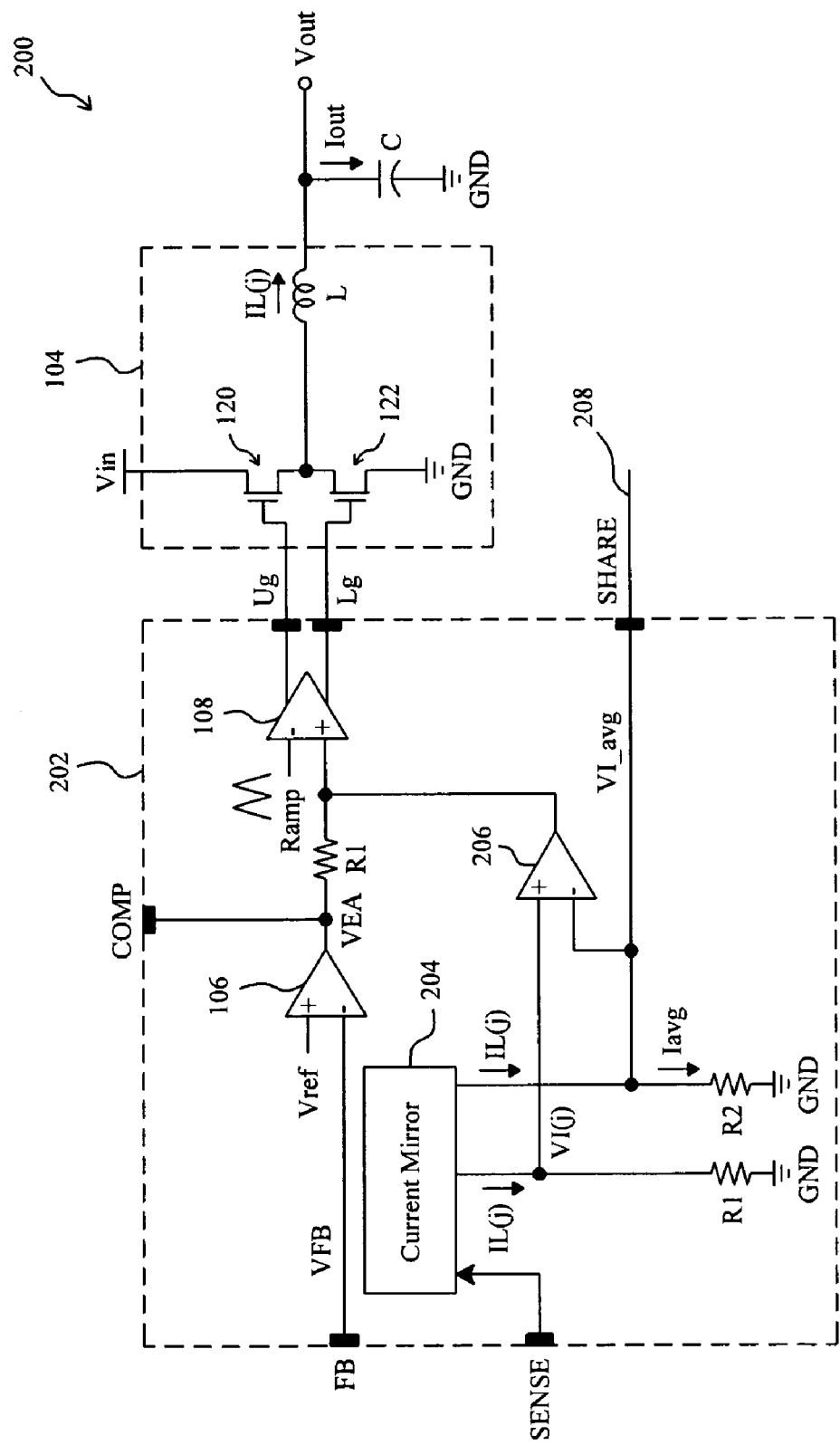
FIG. 2 is a first embodiment according to the present invention.
Figure 3:
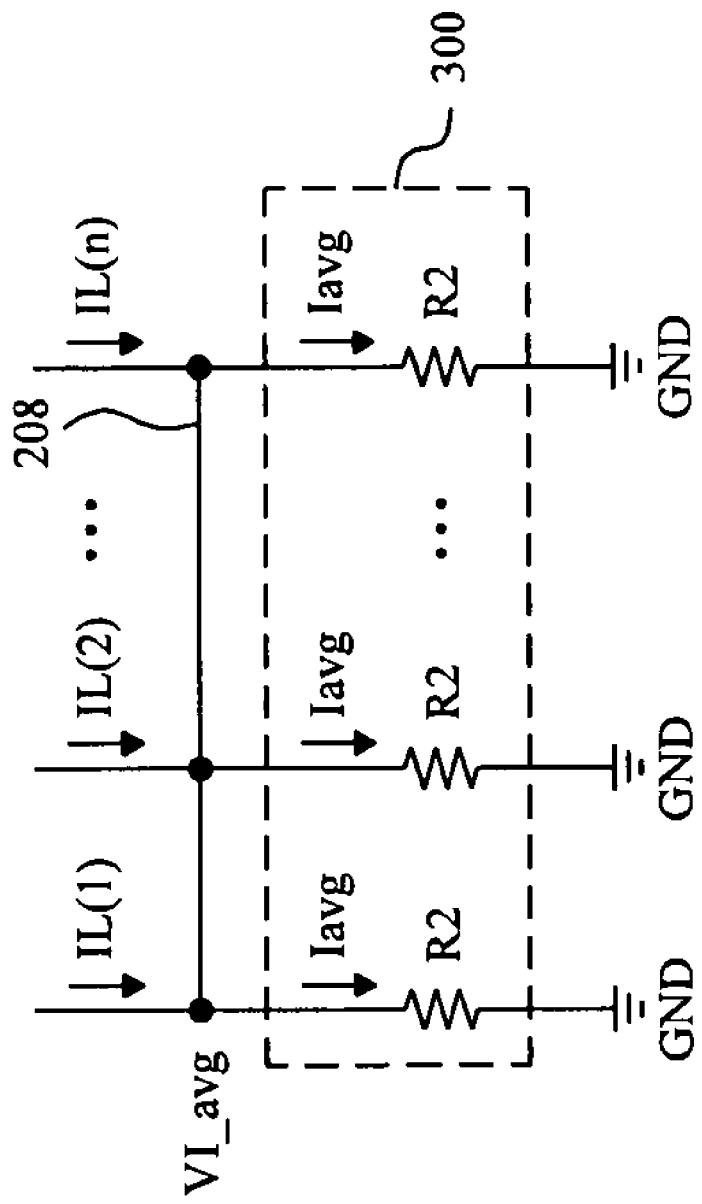
FIG. 3 is a schematic view showing resistors connected in parallel between a share bus and ground.
Figure 4:
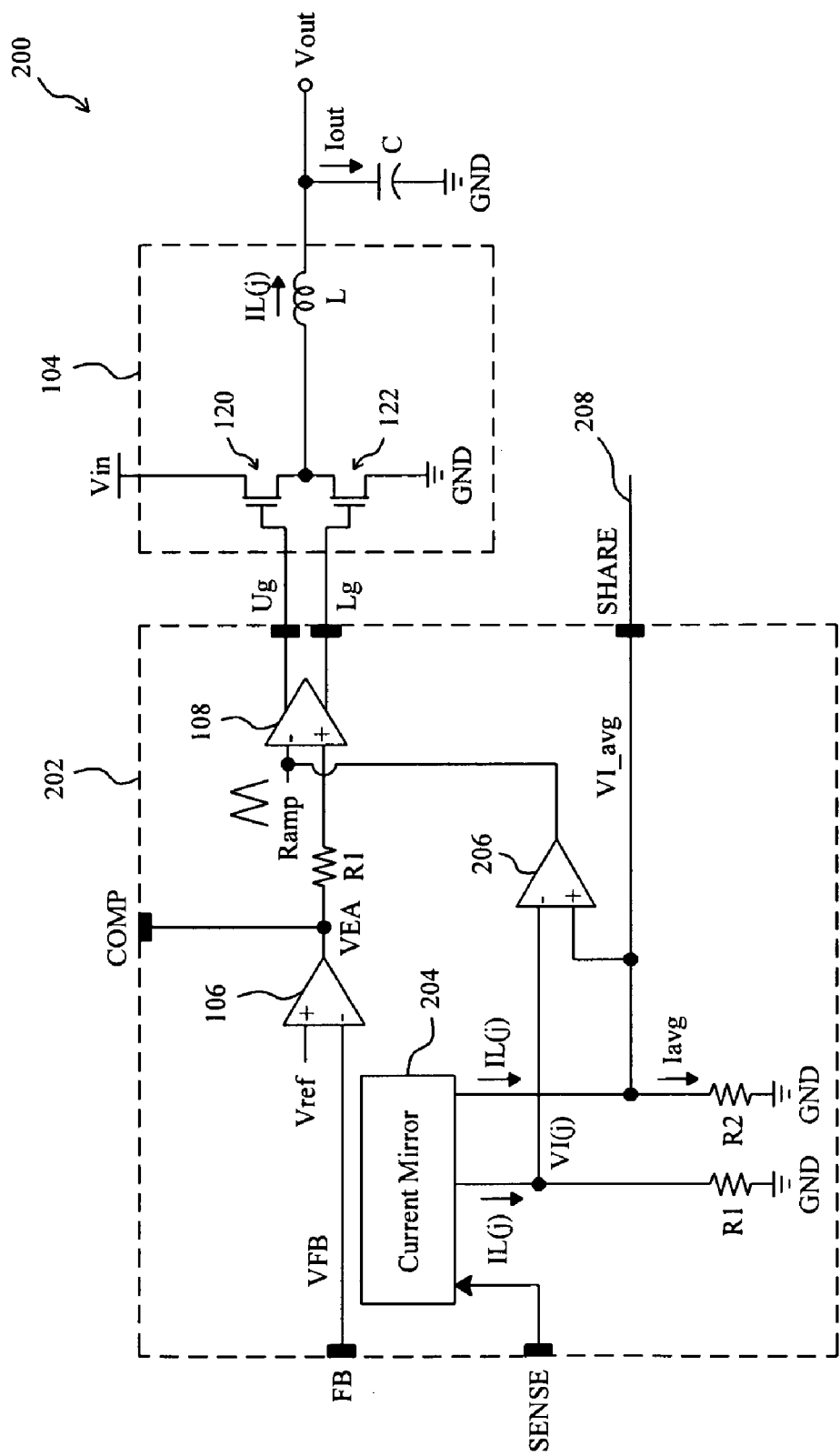
FIG. 4 is a second embodiment according to the present invention.

FIG. 2 is a first embodiment according to the present invention, which shows a converter module 200 of a power converter system including 'n' converter modules, where 'n' is a natural number greater than two. For simplicity, only the j-th converter module 200 is shown in FIG. 2, where j=1,2, . . . ,n, and each of the other converter modules of the power converter system has the same configuration as that shown in FIG. 2. The converter module 200 includes a controller 202 and a power stage 104 driven by the controller 202 to modulate a phase current IL(j). The controller 202 is a semiconductor chip and has two pins FB and SENSE to receive a feedback signal and a current sense signal respectively, as described in FIG. 1, and the error amplifier 106 and the comparator 108 operate as those shown in FIG. 1. In the controller 202, a circuit for improving current balance accuracy includes a current mirror 204 connected to the pin SENSE and two resistors R1 and R2. The current mirror 204 receives the current sense signal from the pin SENSE and mirrors it to produce two currents IL(j). As described in FIG. 1, the current sense signal represents the phase current of the associated converter module, and for simplicity, in this embodiment, the phase current IL(j) is used to represent the currents that the current mirror 204 produces by mirroring the current sense signal. The resistor R2 is also connected to a share bus 208 by a pin SHARE of the controller 208, and thus all the resistors R2 of the converter modules of the power converter system are connected in parallel between the share bus 208 and ground GND, as shown in FIG. 3. Referring to FIG. 3, each of the converter modules provides its phase current to the share bus 208, as shown by IL(1), IL(2), . . . , IL(n), and all the resistors R2 of the converter modules can be regarded as an equivalent resistor 300 whose resistance is R2/n. Therefore, the voltage across the equivalent resistor 300 is $$VI\_avg = (R2/n) \times (\Sigma IL(j))$$ [Eq-1]
$$= R2 \times [(\Sigma IL(j))/n]$$
$$= R2 \times Iavg,$$

where Iavg is the average current of the converter modules. By using the configuration as shown in FIG. 3, the average current information is automatically extracted from the share bus 208. Referring to FIG. 2, the voltage across the resistor R1 is $VI(j)=IL(j)\times R1$, and the voltage across the resistor R2 is VI_avg. The controller 202 has a comparator 206 to compare the voltages VI(j) and VI_avg to produce an output signal injecting into the non-inverting input of the comparator 108 for modulation of the phase current IL(j) of the associated converter module 200. If the resistance R1 equals the resistance R2, the comparison between the voltages VI(j) and VI_avg can be regarded as the comparison between the phase current IL(j) and the average current Iavg. The output signal of the comparator 206 to be injected into the non-inverting input of the comparator 108 will be proportional to the difference between the phase current IL(j) and the average current Iavg. As a result, the phase current IL(j) will be toward the average current Iavg. Alternatively, the output signal of the comparator 206 can be injected into the inverting input of the comparator 108 with opposite polarity, as shown in FIG. 4.

As shown in the embodiment of FIG. 2, by using the current mirror 204 to mirror the phase current IL(j) to provide a mirror current IL(j) to the one-wire share bus 208, information of the average current Iavg can be directly extracted from the share bus 208 as the reference signal for comparison with the phase current IL(j) for modulation of the phase current IL(j) of the converter module 200. Compared with the conventional current balance mechanism of FIG. 1, the circuit and method according to the present invention is simpler. Moreover, the bias voltage source 112 and the diode 116 are not needed, and thus the phase current IL(j) is balanced more accurately.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A circuit for improving current balance accuracy of a power converter system having a plurality of converter modules connected to a share bus, the circuit comprising:
   a first component, the first component forming a first resistor;
   a current mirror connected to the first component and the share bus, and mirroring a phase current to provide a first mirror current to the first component to derive a first signal representative of the phase current and a second mirror current to the share bus;
   a second component connected to the share bus and extracting an average current from the share bus to derive a second signal representative of the average current, the second component forming a second resistor; and
   a comparator connected to the first and second components, and comparing the first signal with the second signal to produce an output signal for modulation of the phase current;
   wherein the first and second resistors have substantially the same resistance.

2. The circuit of claim 1, wherein the second resistors in each of the converter modules comprise a substantially same resistance.

3. A method for improving current balance accuracy of a power converter system having a plurality of converter modules connected to a share bus, the method comprising:
   mirroring a phase current to provide a mirror current flowing through a resistor to derive a voltage across the resistor as a first signal;
   extracting an average current from the share bus;
   generating a second signal representative of the average current; and
   comparing the first signal with the second signal to produce an output signal for the modulation of the phase current:
   wherein the step of extracting an average current from the share bus comprises the steps of:
      connecting a plurality of resistors to the share bus such that the resistors are connected in parallel, each of the converter modules being provided with one of the resistors; and
      mirroring the phase current to provide a mirror current to the share bus;
   wherein the resistor and the plurality of resistors have substantially the same resistance.

4. The method of claim 3, wherein the plurality of resistors comprise a substantially same resistance.

5. A method for improving current balance accuracy of a power converter system having a plurality of converter modules connected to a share bus, each of the converter modules having a phase current, the method comprising:
   mirroring each of the phase currents to provide mirror currents to the share bus, each of the mirror currents flowing through a first resistor;
   each of the converter modules extracting an average current from the share bus; and
   each of the converter modules comparing the phase current of itself with the average current it extracts from the share bus to produce an output signal for modulation of the phase current of itself;
   wherein the step of each of the converter modules extracting an average current from the share bus comprises connecting a plurality of second resistors to the share bus such that the second resistors are connected in parallel to obtain the average current from the share bus, each of the converter modules being provided with one of the second resistors;
   wherein the first and second resistors have substantially the same resistance.

6. The method of claim 5, wherein the plurality of second resistors comprise a substantially same resistance.

* * * * *